US008821667B2

(12) United States Patent
Sneddon

(10) Patent No.: US 8,821,667 B2
(45) Date of Patent: *Sep. 2, 2014

(54) MULTILAYER COMPOSITE PRESSURE VESSEL AND METHOD FOR MAKING THE SAME

(71) Applicant: Arde, Inc., Carlstadt, NJ (US)

(72) Inventor: Kirk Sneddon, Glen Head, NY (US)

(73) Assignee: Arde, Inc., Carlstadt, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,689

(22) Filed: Jun. 11, 2013

(65) Prior Publication Data

US 2013/0276961 A1 Oct. 24, 2013

Related U.S. Application Data

(62) Division of application No. 12/290,819, filed on Nov. 4, 2008, now Pat. No. 8,481,136, which is a division of application No. 11/232,463, filed on Sep. 21, 2005, now Pat. No. 7,497,919.

(51) Int. Cl.
*B29C 70/86* (2006.01)

(52) U.S. Cl.
USPC .......................... 156/172; 156/169; 156/175

(58) Field of Classification Search
USPC .......................... 156/172, 175, 169
See application file for complete search history.

(56) References Cited

U.S. PATENT DOCUMENTS

| 3,276,936 | A | * | 10/1966 | Uhlig | 156/425 |
| 4,421,827 | A | * | 12/1983 | Phillips | 428/418 |
| 4,783,362 | A | * | 11/1988 | Thornton et al. | 442/203 |
| 5,822,838 | A | * | 10/1998 | Seal et al. | 29/469.5 |
| 7,497,919 | B2 | * | 3/2009 | Sneddon | 156/172 |

FOREIGN PATENT DOCUMENTS

WO    WO-89/02361 A1 *  3/1989

* cited by examiner

*Primary Examiner* — Jeff Aftergut
(74) *Attorney, Agent, or Firm* — Joel G Landau

(57) ABSTRACT

A pressure vessel for containing materials under elevated pressures includes a metal liner and an adhesive layer, applied to the outer surface of the metal liner, where the adhesive layer is treated with a vacuum bag in order to secure the adhesive to the outer surface of the liner. An overwrap layer is applied on top of the adhesive on the outer surface of the metal finer, where the overwrap layer is formed by winding a filamentary material around the liner, such that the filamentary material adheres to the adhesive forming an overwrap layer on the outer surface of the metal liner, forming the pressure vessel.

8 Claims, 4 Drawing Sheets

MULTILAYER COMPOSITE PRESSURE VESSEL AND METHOD FOR MAKING THE SAME

RELATED APPLICATIONS

This application is a divisional application of co-pending U.S. patent application Ser. No. 12/290,819, filed on Nov. 4, 2008, which is a divisional of U.S. patent application Ser. No. 11/232,463, filed on Sep. 21, 2005 (now issued as U.S. Pat. No. 7,497,919). The entirety of these related disclosures are incorporated herein by reference.

FIELD OF THE INVENTION

The present invention relates to containers in general. More particularly, the present invention relates to light weight vessels capable of accommodating various media at relatively high pressures.

BACKGROUND

In many technical fields, a need exists for staring various liquid or gaseous media, such as compressed or liquefied gases, for extended periods of time and frequently at very high pressures. Many attempts have already been made in the past to satisfy this need by developing lightweight pressurized medium containers or pressure vessels that would accommodate the pressurized medium without suffering leakage losses or structural damage.

For a variety of reasons, not the least important of which is the relatively high ratio of pressure that the vessel walls are able to withstand to the weight of a vessel of a given capacity, it has been found advantageous to give such walls a multilayer or composite structure, including an inner liner and an outer shell surrounding the liner and in intimate contact therewith. The liner is formed of a material usually a metallic material that is compatible with (i.e. inert with respect to) and also completely or at least highly impermeable to the medium being stored.

All-metallic pressure vessels have been disclosed, for example, in U.S. Pat. Nos. 2,127,712; 2,661,113; 3,140,006; and 4,964,524, of which all but the second one are directed to vessels of multilayer construction. In this instance, one of the purposes of the liner is to form an inert protective barrier preventing the medium from reaching through gross leakage or permeation through the liner to the outer shell and possibly damaging the shell. However, due to their considerable thickness and intimate contact or engagement with the shell, the liners of all-metallic pressure vessels generally contribute significantly to the load bearing capacity of the vessel. In classical state of the art vessel fabrication, the liner represents a significant fraction of the total weight. Experience with such and similar all-metallic pressure vessel constructions has shown, on the other hand, that they are limited in applicability because they are either too heavy (a criterion that is of paramount importance for applications where weight is at a premium, such as in outer space applications), or expensive to manufacture, or prone to failure, especially due to metallic material fatigue at weakened or stress concentration regions after having been subjected to a number of pressurization and depressurization cycles.

With the advent and development of high strength filaments such as glass, graphite, and synthetic plastic material fibers, and of materials, such as epoxy resins, capable of forming a matrix embedding such filaments and bonding them together into a composite structure, attempts have been made, some more successful than others, to use such composite materials for the outer shell of the pressure vessel. Of course, due to the high strength-to-weight ratio of such materials, the overall weight of the resulting vessel is significantly reduced relative to that of a comparable all-metallic vessel of the same capacity and pressure rating. Examples of vessels of this kind are disclosed, for example, in U.S. Pat. Nos. 2,744,043; 2,827,195; 3,943,010; 3,969,812, 4,040,163; and 5,653,358.

For example, U.S. Pat. No. 5,653,358 among other elements, describes a tank of composite structure. A vessel is comprised principally of an inner liner (such as a metal liner) coated with a primer and an overwrap or jacket. To that end, the outer jacket is constructed, in a known manner, by superimposed and overlapping layers of impregnated filamentary material that contains glass, graphite or Kevlar™ fibers wrapped in different directions around the liner, with the interstices between the fibers or filaments being filled by impregnating material such as hardenable epoxy resin that, upon setting or hardening, forms a matrix that firmly embeds such fibers or filamentary material.

Thus, after hardening, the filamentary and impregnating material together form a composite, fiber reinforced solid body that is capable of withstanding most if not all of the forces applied to the vessel during its lifetime.

However, the prior art methods of applying the wrapped jacket to the metal liner of the vessel suffers from many drawbacks. In the prior art, a metal liner is first coated with a primer and then the adhesive is used to structurally couple the liner to the overlying filament wound composite. Most commonly a reticulating film adhesive is used. In such an application, pre-cut pattern shapes or gore panels are applied by gloved hands prior to the commencement of composite lay-up. In this application, fibers are impregnated with a wet winding resin before application. The bearing pressure for bondline curing, required to ensure a good bond between the adhesive and the metal liner, is developed as a by-product of the tension in the fiber tows (jacket material) that are filament wound in a pre-programmed repeating closure pattern over the liner and adhesive.

Upon completion of the winding, which consists of multiple layers of the reinforcing fibers and impregnating resin, the composite structure is cured. The adhesive and wet winding resins are compatible and co-curable.

This wet winding process by its nature develops variable bearing pressures on the liner as a result of fiber buildup near the polar regions (ie. boss and/or exit of the vessel) of the wind. This frequently results in roping/bridging of the fiber with a resulting loss of bearing pressure. The hearing pressure also varies due to resin rheology (time and temperature dependent viscosity response.) Resin trough behavior is recognized as resin bleedout during the early stages of wet winding cure (first stage also known as gelation). The variability in bearing pressure is a limiting factor in developing optimal adhesion of the overwrap layer to the metal liner. The critical parameter is adhesion to the metal liner, the adhesion to the co-cured overlying composite structure is readily achieved through selection of compatible and co-curable adhesives and wet winding epoxies.

It is understood, that structural coupling between the inner liner layer and the outer jacket layer is critical, particularly when the pressure vessels are filled with loads under high pressure. Poor adhesion between the overwrap layer and the metal liner caused by irregular bearing pressure during the overwrap application can result in liner elastic stability/buckling failure. The thin metal liner, as a standalone structural entity, is incapable of supporting the high bearing pressure imposed at zero or low pressure by the overlying composite after vessel autofrettage. The elastic stability or buckling failure of the liner results in dramatic reductions in fatigue life, resulting through cracks in the metal liner and leakage of contents within a small number of cycles.

SUMMARY

As such it is the object of this invention to provide a high pressure light-weight pressure vessel that overcomes the drawbacks associated with the prior art and is constructed having improved adhesion between the inner liner and outer jacket layers. Additionally, it is an object of the present invention to provide a method of consistently manufacturing such pressure vessels with improved adhesion between the inner liner and outer jacket layers.

To this end, the present invention provides a method for manufacturing a high pressure light-weight pressure vessel including the steps of obtaining a metal liner, applying a first layer of adhesive to an outer surface of the metal liner, placing the metal liner into a vacuum bag and applying a vacuum to the vacuum bag, thus securing the adhesive to the outer surface of the metal liner. After curing of the adhesive, a filamentary material is wound around the liner, where the filamentary material adheres to the first layer of adhesive forming an overwrap layer on the outer surface of the metal liner, forming the pressure vessel.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings:

DETAILED DESCRIPTION

Figure 1:
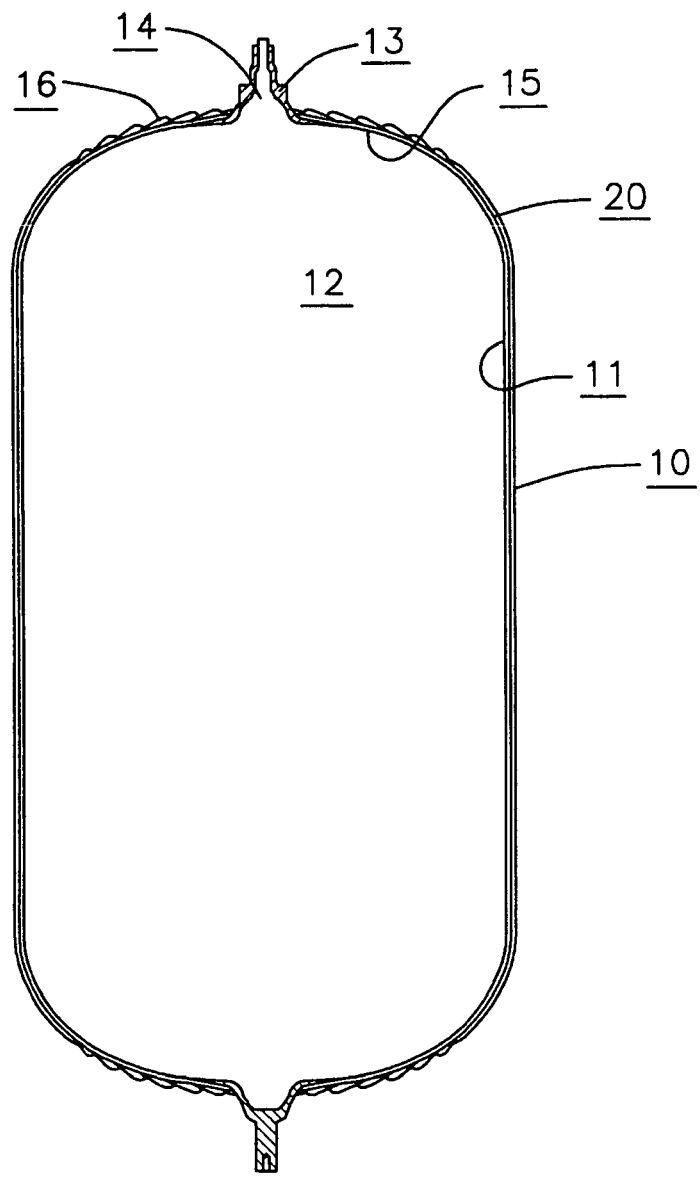
FIG. 1 is a cross section of a pressure vessel, according to one embodiment of the present invention.

Referring now to the drawings, and initially to FIG. 1, it may be seen that the general reference numeral 30 identifies a pressure vessel embodying the present invention. Pressure vessel 10 (also referred to as vessel 10) has a main portion 11 that bounds an internal chamber or interior 12 of vessel 10, and a stem or neck portion 13 that projects out of the main portion 11 along an axis and is hollow to define a passage 14 for establishing communication between the interior 12 of the vessel 10 and its exterior.

As illustrated in FIG. 1, the vessel 10 is of a multilayer or composite structure in that it includes an inner liner 15 and an outer jacket or overwrap 16 that surrounds the liner 15 and, more particularly, at least a main portion 11 of the liner that bounds interior 12. Liner 15 used in the vessel 10 of the present invention is preferably very thin, such that its thickness is chosen to be just above the minimum needed to prevent permeation of the medium contained in interior 12 through liner 15 at the highest pressure differential expected to be encountered between interior 12 of vessel 10 and its exterior during the lifetime of vessel 10, and at a level needed to prevent tearing of or other physical damage to liner 15 when exposed to the highest anticipated or intended internal pressure.

Liner 15 is a thin metal element formed via seamless spinning, welding of a formed and machined part, electrodeposition or other such techniques. The diameter to thickness ratio of the liner may be 500/1 and above. The thickness of liner 15 generally is insufficient to enable liner 15 to withstand the expected internal pressures on its own or even to make more than a rather insignificant (less than 5%) contribution to the overall strength of vessel 10. More importantly, without a high integrity coupling to a overlying composite 16 described below, the compressive stresses in the metal liner 15, developed in reaction to the imposed bearing from the pre-stressed overlying composite at the zero pressure condition typically causes and elastic stability or buckling failure. At operating pressure the overwhelming majority of the load is borne by the outer jacket 16. Both liner 15 and composite 16 are in a state of tension.

Figure 2:
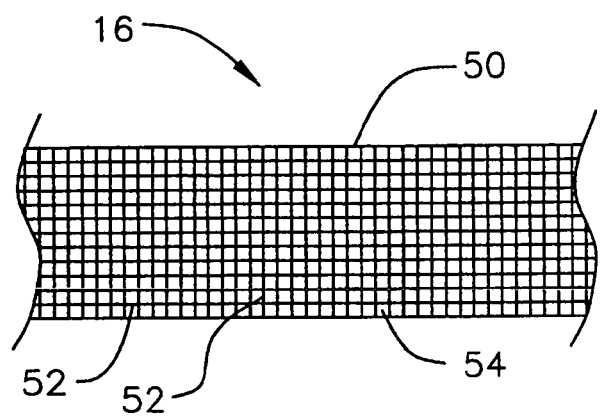
FIG. 2 is a close up the filament of the overwrap layer, in accordance with one embodiment of the present invention.

As illustrated in FIG. 2, a close up of a single fiber or filamentary material 50 from overwrap layer 16 is shown. Overlay layer 16 is typically made from superimposed and overlapping layers of this impregnated filamentary material 50 that contains glass, graphite or Kevlar™ fibers 52 wrapped in different directions around liner 15, with the interstices 54 between the fibers or filaments being filled by impregnating material such as hardenable epoxy resin that, upon setting or hardening, forms a matrix that firmly embeds such fibers or filamentary material.

Figure 3:
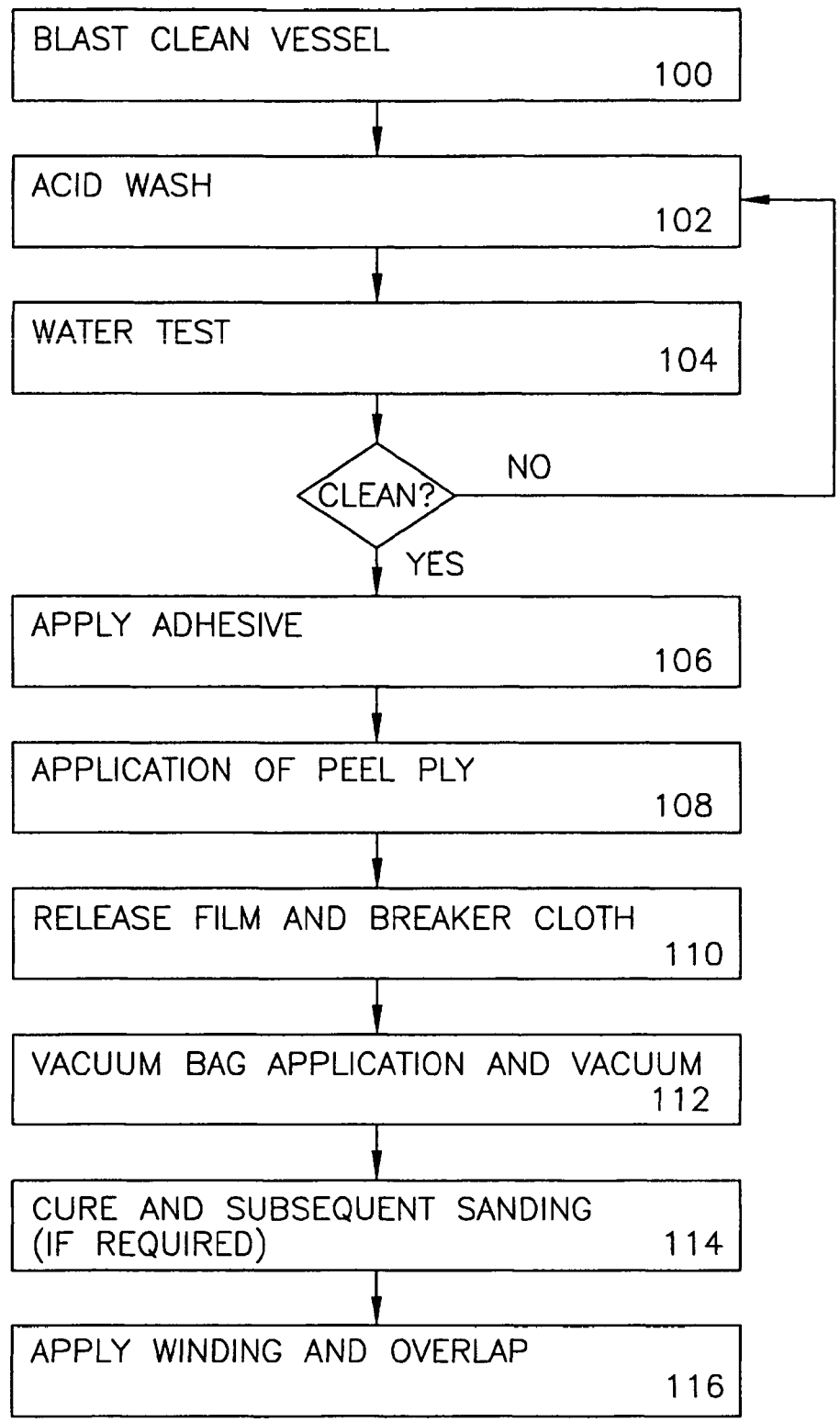
FIG. 3 is a flow chart depicting the process for forming the pressure vessel from FIG. 1, in accordance with one embodiment of the present invention.
Figure 5:
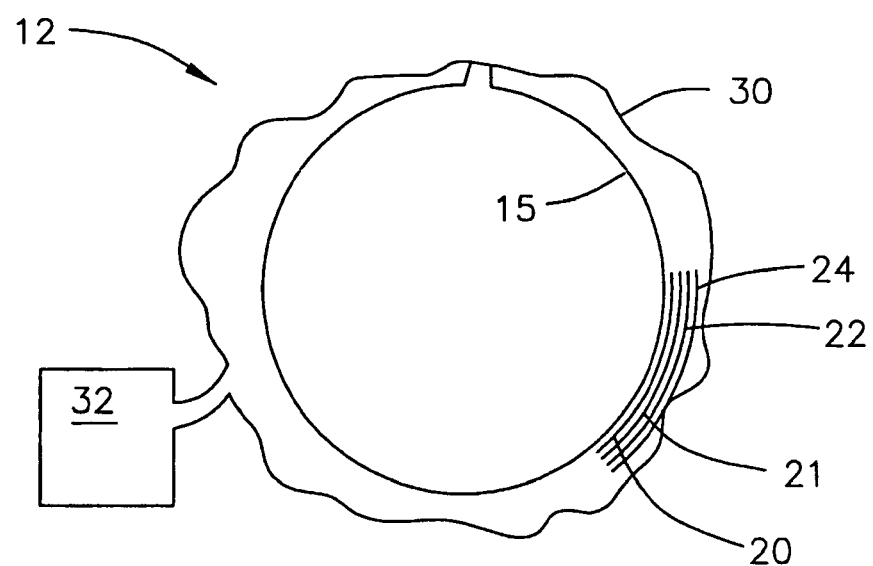
FIG. 5 is a view of the adhesive layer being cured to the liner of the pressure vessel by a vacuum bag, in accordance with one embodiment of the present invention.

Turning now to the construction process of vessel 10, a flow chart is shown in FIG. 3, illustrating a typical step by step process for applying overwrap 16 to liner 15. It is understood that the following process is exemplary of the salient features of the process, but that certain steps may either be added, eliminated moved or otherwise altered, provided that the essential steps are all included.

At a first step 100, the metal liner 15 is subjected to a media blasting operation for surface roughening and/or mechanical surface activation. This step is to ensure that the adhesive discussed in detail below has improved surface area for maximum binding with the outer surface of liner 15. Media blasting may take the form of glass bead, Al (Aluminum) Oxide or other conventional media as used to impart random roughening to a surface.

Next, at step 102, the media blasted liner 15 is treated with an acid wash for cleaning away all molecular/organic contaminants and surface resident blasting particles and to provide chemical activation of the surface. This is accomplished by different acid mixtures depending on liner material. Nitric acid is a common constitute and is widely used for aluminum liners. Fluoric or oxalic acid additions are made for nickel or titanium based alloys. The intent of media blasting, followed by acid washing is to provide a roughened surface free of detrimental oxide films and any molecular contamination that could ultimately contribute to reduced bond strength. The liner is then water rinsed to remove all acid residue.

After cleaning, at step 104, a water break test is performed to the dried liner. Distilled water is sprayed against liner 15. If it is clean, the water should sheet off of the part. If not clean, the water tends to bead. If liner 15 does not pass the water test it may be returned to step 102 and washed again until clean.

Figure 4:
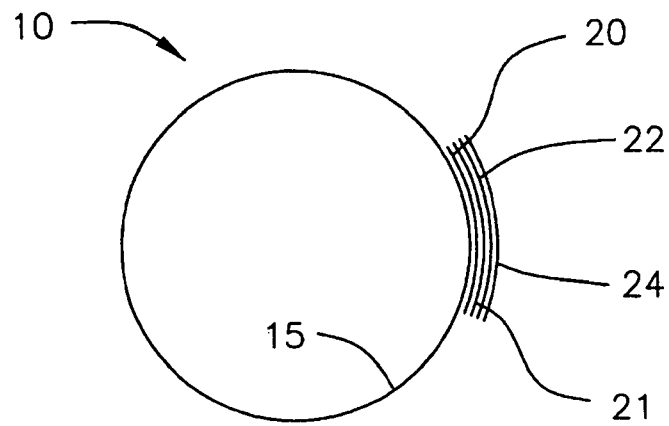
FIG. 4 is a close up of the adhesive layer being applied to the liner, in accordance with one embodiment of the present invention.

Assuming the part is clean, at step 106, a film adhesive layer 20 is applied to liner 15, as shown in close up illustration FIG. 4. Thus, rather than using a typical primer as done in the prior art, which provides inferior structural response properties to the adhesive, the present invention, binds the adhesive directly to the metallic outside of liner 15. This adhesive layer 20 is applied to the outside of the liner 15 by the conventional method using pre-cut pattern shapes or gore panels, by gloved hands.

At step 108, peel ply cloth 21, is applied to the uncured adhesive 20. Removal of peel ply 21, post cure, provides optimal surface roughness. A second purpose of peel ply 21 is to provide a direct contact breather element, allowing volatiles from the film adhesive 20 to de-gas during consolidation and cure without leaving bubble artifacts post cure as are often seen in vacuum bagged cured film adhesive.

Next, at step 110, a release film 22 is applied to the peel ply 21, as well as a breaker cloth 24, both shown in FIG. 4. The purpose of release film 22 is to allow parting or disassembly upon completion of cure. Breather cloth 24, typically constructed of coarse weave fiberglass serves to provide a bearing distribution path from vacuum bag 30, discussed below, onto release film 22, further transmitting onto peel ply 21, film adhesive 20, and ultimately metal liner 15, thus providing uniform bearing pressure during cure.

After adhesive layer 20, peel ply 21, release film 22 and breaker cloths 24 are applied, at step 112, a vacuum bag 30 is placed over the entire coated liner 15. As with typical vacuum bag processes liner 15 is placed in vacuum bag 30, which is then evacuated, thus by bag pressure, providing a pressurized cure environment for adhesive 20. Vacuum bag 30 is evacuated through a fitting in the bag via a vacuum pump 32. This vacuum bag process is most typically used to de-gas/consolidate, and subsequently cure hand layup pre-impregnated fibrous composites structures. De-gassing can also be referred to as de-bulking as it works to reduce the void fraction in the layed-up composite structure.

The vacuum process may act as both a de-bulking process and a cure process. Typically, however heat is applied to cure the adhesive 20 to perform the curing operation. Positive pressure cure ovens (autoclaves), which will operate at 25 to 75 psi are commonly used. This allows release of the internal vacuum from bag 30 (venting the inside of the bag to atmospheric pressure), while maintaining a pressure differential across bag 30 by virtue of pressurization of the oven (autoclave). The venting of the inside of bag 30 is most often done to prevent rapid volatilization of impregnating resin or adhesive constituents, which will result in reduced composite properties due to high void fraction (porosity.)

In the present invention, a typical heat the vacuum process may employ a ramping up and down of the curing temperature. On such example, would follow the following steps: 1) vacuum to 25 inches of Mercury or better; 2) hold for 10 minutes; 3) ramp up temperature to 250° F. at approximately 2 to 5° F./minute; 4) hold at 250° F.+/−10° F. for 90+/−15 minutes; ramp down temperature at approximately 2 to 5° F./minute. It is understood that this is just one example of temperatures used for curing, however other temperatures may be used as necessary for different adhesives 20.

In the present invention, the need to vent bag 30 for curing operations is eliminated by two factors. The first factor being that peel ply 21 placed in intimate contact with the thin layer of adhesive 20 serves the function of a secondary breather element. There is 100% surface contact to the thin underlying adhesive 20 to peel ply 21 giving adhesive volatiles a low resistance path for evacuation. Thus, large detrimental voids are not created. Secondly, the small voids in the thin cured adhesive film 20 will be open to the surface upon removal of peel ply 21. The second layer of film adhesive included in impregnated filamentary material 50 upon application of the winding 16 flows into the open surface voids providing beneficial mechanical interlocking between adhesive layer 20 and filamentary material 50 of overwrap layer 16.

Once the vacuum step is complete, at step 114, the cured adhesive layer 20 is, if required, treated by sanding or scuffing to remove any wrinkles, leaving the textured peel ply surface in the adhesive 20 as is achieved through the stripping (removal of the peel ply 21.

Next, at step 116, once adhesive layer 20 is prepared and cured, overlap layer 16 is then applied to the coated liner 15. As discussed above, overlapping layers of impregnated filamentary material 50 that contains glass, graphite or Kevlar™ fibers are wrapped in different directions around liner 15, with the interstices 52 between the fibers or filaments being filled by impregnating material 54 such as hardenable epoxy resin (wet winding resin) that, upon setting or hardening, forms a matrix that firmly embeds such fibers or filamentary material 50. The filament 50 is wound in a pre-programmed repeating closure pattern over the liner and adhesive layer 20 of liner 15. This results in a thorough and complete binding between liner 15 and overwrap layer 16.

The above described process provides a distinct advantage over the prior art. First, consistent high strength bonds are readily achieved on epoxy compatible epoxy substrates than metal substrates. Roughened epoxy substrates, such as a peel ply surface, represent the ideal substrate.

Thus, by using the vacuum process outlined above for adhesive layer 20, a solid and complete bond between the metal liner 15 and adhesive 20 is formed. The pressure of the vacuum ensures this process significantly better than in prior art systems where the pressure to cause adhesion between the adhesive 20 and metal liner 15 was only a by-product result of the uneven and unpredictable binding pressure of the overwrap layer 16. Bonding to the metal surface of liner 15 (substrate) is done at known, consistent and verifiable bearing pressure by the above vacuum process.

Thereafter, the present invention allows for overwrap layer 16, with its impregnated wet winding resin, to be applied to a cured adhesive layer 20, having an excellent roughened binding surface as well as a fully connected and cured adhesion to the metal surface of liner 15.

Splitting the operation into two steps, vacuum and cure of adhesive later 20 and winding of overwrap layer 16, dramatically enhances the adhesion of overwrap layer 16 to the metal substrate (liner 15). The vacuum bag de-bulking insures removal of entrapped air between metal liner 15 and adhesive 20. A consistent bearing pressure as imposed by the vacuum bag 30 maximizes flow of adhesive 20 into the micromechanical valleys of the random roughness prepared metal substrate (liner 15). The consistent bearing pressure cannot be achieved in traditional processing. After cure the integrity of the adhesive to liner binding (cohesion) can be verified through both the mechanical stripping of the peel ply 21, which provides an in-process peel test, to screen substandard bonding and through visual inspection upon removal of peel ply 21.

The overall adhesion of overwrap layer 16 to metal liner 15 is the fabrication critical element for vessel 10. Far less bearing pressure is required to develop a high integrity bond to a compatible epoxy substrate than to a primed metal liner of the prior art. The direct and continuous processing through surface isolation of metal liner 15 by adhesive layer 20 is accomplished through the above process. The cured adhesive layer 20 serves as a protective primer, with superior performance to conventional brush on or spray on primers.

The epoxy substrate (adhesive layer 20) from the above outlined vacuum process is rougher. At a micromechanical level there is open surface porosity, which allows a second layer of adhesive (epoxy impregnated into the filamentary material 50) to flow into and cure within the microvoids during step 116 when overwrap layer 16 is applied. This provides a mechanical interlocking to the substrate (adhesive layer 15) resulting in a high fidelity bond.

Further steps may be taken to improve the overall quality of vessel 10. For example, witness coupons for the critical bonding process can be prepared and tested and accurately reflect the peel performance to metal liner 15. Post operation visual inspection is readily performed as well as removal and rework of substandard cure, readily achieved by nitric acid digestion.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A method for manufacturing a pressure vessel, comprising:
    applying an adhesive to a liner of the pressure vessel;
    applying a peel ply on the adhesive;
    applying a release film on the peel ply;
    applying a breather cloth on the release film;
    applying a vacuum bag over the breather cloth;
    at least partially evacuating the vacuum bag;
    heat curing the adhesive; and
    removing the release film, breather cloth, vacuum bag, and peel ply after said heat curing, leaving a textured surface upon the adhesive.

2. The method as recited in claim 1, wherein said applying the adhesive to the liner further comprises applying the adhesive as a film adhesive.

3. The method as recited in claim 1, further comprising:
    winding a filamentary material around the adhesive, wherein the filamentary material adheres to the adhesive forming an overwrap layer.

4. The method as recited in claim 3, further comprising:
    impregnating the filamentary material with a resin that binds with the adhesive to form the pressure vessel.

5. The method as recited in claim 1, further comprising:
    forming the liner from a metallic material to form the pressure vessel.

6. The method as recited in claim 5, further comprising:
    forming the metallic material of a thickness with which provides less than a 5% contribution to the strength of the pressure vessel.

7. The method as recited in claim 1, further comprising:
    roughing the liner surface prior to applying the adhesive.

8. The method as recited in claim 1, wherein said heat curing occurs under pressure of the vacuum bag.

* * * * *